UNITED STATES PATENT OFFICE.

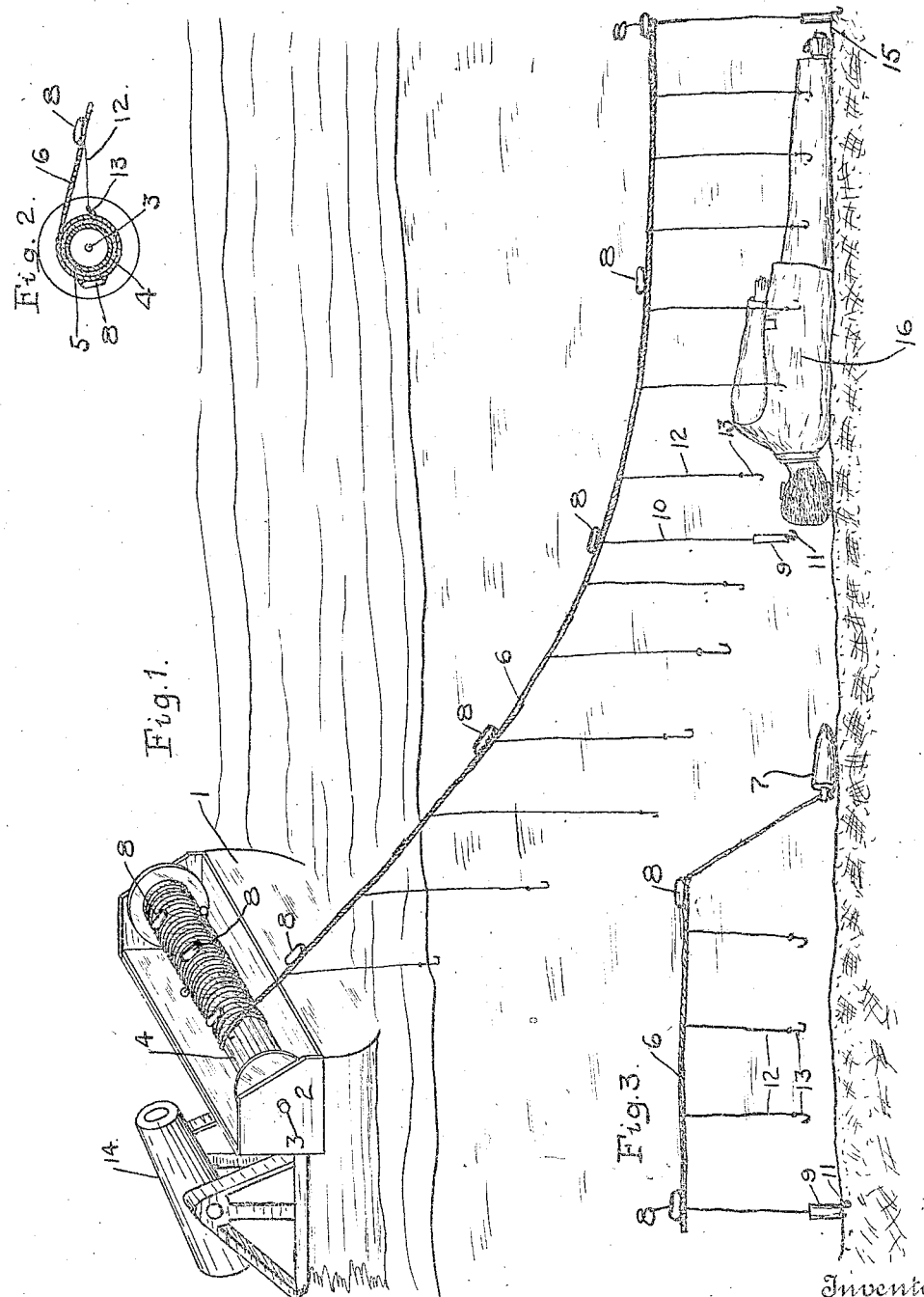

JACOB FRANZ, OF ERIE, PENNSYLVANIA.

LIFE-SAVING APPARATUS.

946,798.

Specification of Letters Patent. Patented Jan. 18, 1910.

Application filed August 16, 1909. Serial No. 512,964.

*To all whom it may concern:*

Be it known that I, JACOB FRANZ, a citizen of the United States, residing at Erie, in the county of Erie and State of Pennsylvania, have invented new and useful Improvements in Life-Saving Apparatus, of which the following is a specification.

This invention relates to life saving apparatus, and consists in certain improvements in the construction thereof, as will be hereinafter fully described and pointed out in the claims.

The invention is illustrated in the accompanying drawings as follows:

Figure 1 shows a perspective view of the apparatus; Fig. 2 shows a cross section of the reel; Fig. 3 a continuation of the apparatus shown in Fig. 1.

1 marks the boat; 2 the bracket mounted on the boat; 3 a shaft journaled in the bracket 2; and 4 a reel mounted on the shaft. This reel is preferably provided with a cork surface 5, for a purpose hereinafter described.

A main line 6 is provided with a projector 7 at its end, which, when the apparatus is used, forms the anchor for the line. The line is provided with a series of floats 8, and also a series of weights 9, which are connected with the main line by weight lines 10. The weights 9 are of sufficient mass to draw down the floats 8. The weights are provided with hooks 11, which, as the main line is wound on the reel 4, have their points and bending cork surface so as to maintain the weights in position on the reel until the main line is played out.

A series of hooks 13 are carried by the hook lines 12 which are secured to the main line. The hook lines 12 are of such length that when the weights 9 are on the bottom 15, the hooks 13 are above the bottom. The projector 7 may be thrown by a mortar 14.

In the drawings the apparatus is shown as operating on the body 16. The preferable means of operating the apparatus is to throw the mortar carrying the projector to the vicinity of the spot where the body disappeared, and then swinging the boat in a circle around this point, the weights and floats so position the hooks 13 that they will not foul rock or ordinary surface irregularities on the bottom, but on the other hand, will engage a body. In this way a wide circle may be quickly covered, and ordinarily in a time short enough to save the person from drowning.

What I claim as new is:

1. In a life-saving apparatus, the combination of a main line; a series of floats supporting the main line; a series of weights of sufficient mass to draw down the floats; weight lines connecting the weights with the main line; a series of hooks; hook lines secured to the main line, and carrying the hooks, said hook lines being of a length to maintain the hooks off the bottom with the weights on the bottom.

2. In a life-saving apparatus, the combination of a main line; a series of floats supporting the main line; a series of weights of sufficient mass to draw down the floats; weight lines connecting the weights with the main line; a series of hooks; hook lines secured to the main line, and carrying hooks, said hook lines being of a length to maintain the hooks off the bottom with the weights on the bottom; and a reel from which said main line may be cast.

3. In a life-saving apparatus, the combination of a main line; a series of floats supporting the main line; a series of weights of sufficient mass to draw down the floats; weight lines connecting the weights with the main line; a series of hooks; hook lines secured to the main line, and carrying hooks, said hook lines being of a length to maintain the hooks off the bottom with the weights on the bottom, and a reel from which said main line may be cast, having a surface in which the hook points may be embedded.

4. In a life-saving apparatus, the combination of a main line; a series of floats supporting the main line; a series of weights of sufficient mass to draw down the floats; weight lines connecting the weights with the main line; a series of hooks; hook lines secured to the main line, and carrying the hooks, said hook lines being of a length to maintain the hooks off the bottom with the weights on the bottom; hooks arranged to carry the weights; and a reel from which said line may be cast, having a soft surface into which the hook points may be embedded.

5. In a life-saving apparatus, the combination of a main line; a series of floats supporting the main line; a series of weights of sufficient mass to draw down the floats; weight lines connecting the weights with the main line; a series of hooks; hook lines secured to the main line, and carrying the hooks, said hook lines being of a length to maintain the hooks off the bottom with the weights on the bottom; a mortar; and a projectile secured to the main line adapted to be thrown by the mortar.

6. In a life-saving apparatus, the combination of a main line; a series of floats supporting the main line; a series of weights of sufficient mass to draw down the floats; weight lines connecting the weights with the main line; a series of hooks; hook lines secured to the main line, and carrying the hooks, said hook lines being of a length to maintain the hooks off the bottom with the weights on the bottom; a reel from which said line may be cast; a mortar; and a projectile secured to the main line and adapted to be thrown by the mortar.

7. In a life-saving apparatus, the combination of a main line; a series of floats supporting the main line; a series of weights of sufficient mass to draw down the floats; weight lines connecting the weights with the main line; a series of hooks; hook lines secured to the main line, and carrying the hooks, said hook lines being of a length to maintain the hooks off the bottom with the weights on the bottom; a reel from which said main line may be cast, having a surface in which the hook points may be embedded; a mortar; and a projectile secured to the main line, and adapted to be thrown by the mortar.

8. In a life-saving apparatus, the combination of a main line; a series of floats supporting the main line; a series of weights of sufficient mass to draw down the floats; weight lines connecting the weights with the main line; a series of hooks; hook lines secured to the main line, and carrying hooks, said hook lines being of a length to maintain the hooks off the bottom with the weights on the bottom; a reel from which said main line may be cast; hooks for carrying the weights adapted to be embedded in the soft surface of the reel; a mortar; and a projectile secured to the main line and adapted to be thrown by the mortar.

In testimony whereof, I have hereunto set my hand in the presence of two subscribing witnesses.

JACOB FRANZ.

Witnesses:
FLORENCE STOCKERT,
MARGARET BEIGLE.